US012527327B2

(12) United States Patent
Geraths et al.

(10) Patent No.: US 12,527,327 B2
(45) Date of Patent: Jan. 20, 2026

(54) HIGH HYALURONATE MULTI-PURPOSE DISINFECTION SOLUTIONS FOR OPHTHALMIC APPLICATIONS

(71) Applicant: CIS BIOPHARMA AG, Bubendorf (CH)

(72) Inventors: Christian Geraths, Rheinfelden (DE); Rolf Schafer, Arisdorf (CH)

(73) Assignee: CIS Biopharma AG, Bubendorf (CH)

( * ) Notice: Subject to any disclaimer, the term of this patent is extended or adjusted under 35 U.S.C. 154(b) by 760 days.

(21) Appl. No.: 17/781,961

(22) PCT Filed: Dec. 4, 2020

(86) PCT No.: PCT/EP2020/084744
§ 371 (c)(1),
(2) Date: Jun. 2, 2022

(87) PCT Pub. No.: WO2021/110975
PCT Pub. Date: Jun. 10, 2021

(65) Prior Publication Data
US 2023/0148604 A1 May 18, 2023

Related U.S. Application Data

(60) Provisional application No. 62/974,339, filed on Dec. 5, 2019.

(51) Int. Cl.
| | | |
|---|---|---|
| A01N 47/44 | (2006.01) | |
| A01N 25/02 | (2006.01) | |
| A01N 25/30 | (2006.01) | |
| A01N 33/12 | (2006.01) | |
| A01N 43/16 | (2006.01) | |
| A01N 43/40 | (2006.01) | |
| A01P 1/00 | (2006.01) | |
| A61L 12/14 | (2006.01) | |

(52) U.S. Cl.
CPC ............ *A01N 47/44* (2013.01); *A01N 25/02* (2013.01); *A01N 25/30* (2013.01); *A01N 33/12* (2013.01); *A01N 43/16* (2013.01); *A01N 43/40* (2013.01); *A01P 1/00* (2021.08); *A61L 12/142* (2013.01); *A61L 12/145* (2013.01)

(58) Field of Classification Search
CPC ....... A61L 12/142; A01N 47/44; A01N 33/12; A01N 43/16; A01N 43/40
See application file for complete search history.

(56) References Cited

U.S. PATENT DOCUMENTS

| | | | |
|---|---|---|---|
| 5,559,104 A | 9/1996 | Romeo et al. | |
| 5,631,005 A * | 5/1997 | Dassanayake | A61K 31/16 514/840 |
| 5,858,346 A | 1/1999 | Vehige et al. | |
| 8,119,112 B2 | 2/2012 | Xia et al. | |
| 8,664,180 B2 | 3/2014 | Burke et al. | |
| 2008/0096966 A1* | 4/2008 | Burke | A61K 9/0048 514/561 |
| 2008/0197324 A1 | 8/2008 | Zhao et al. | |
| 2009/0196846 A1 | 8/2009 | Xia et al. | |
| 2011/0046033 A1 | 2/2011 | Zhang | |
| 2011/0257125 A1 | 10/2011 | Schaefer | |
| 2013/0202547 A1 | 8/2013 | Burke et al. | |
| 2016/0022860 A1* | 1/2016 | Liu | C11D 3/0078 424/78.04 |
| 2016/0073636 A1 | 3/2016 | Liu et al. | |
| 2018/0098937 A1 | 4/2018 | Horn | |

FOREIGN PATENT DOCUMENTS

| | | | |
|---|---|---|---|
| CN | 1942571 A | 4/2007 | |
| JP | 2015-197479 | 11/2015 | |
| WO | WO 2005/097960 A1 | 10/2005 | |
| WO | WO 2008/049042 A2 | 4/2008 | |
| WO | WO 2009/002703 | 12/2008 | |
| WO | WO 2012/061000 A1 | 5/2012 | |
| WO | WO 2012/154836 A1 | 11/2012 | |
| WO | WO 2014/058613 A1 | 4/2014 | |
| WO | WO-2017055536 A1 * | 4/2017 | ....... B29D 11/00048 |

OTHER PUBLICATIONS

C. Boeriu et al., "Production Methods for Hyaluronan," *Int. J. Carbohydrate Chem.*, vol. 2013, Article ID 624967, (2013) 14 pages.
S. Brafman et al., "Finding the Balance for Contact Lens-Associated Dry-Eye," *Review of Cornea & Contact Lenses*, (Jan./Feb. 2012) pp. 18-21.
E. Carlson et al., "Impact of Hyaluronic Acid-Containing Artificial Tear Products on Reepithelialization in an In Vivo Corneal Wound Model," *J. Ocular Pharmacology and Therapeutics,.* vol. 34, No. 4, (2018) pp. 360-364.
C. Scheuer et al., "Increased concentration of hyaluronan in tears after soaking contact lenses in Biotrue multipurpose solution," *Clinical Ophthalmology (Auckland, N.Z.)* 10, (2016) pp. 1945-1952.
J. Gilchrist et al., "Spiral Plate Method for Bacterial Determination," *Applied Microbiology*, 25(2):244-52 (Feb. 1973).

(Continued)

*Primary Examiner* — Eric Olson
*Assistant Examiner* — Benjamin M Brandsen
(74) *Attorney, Agent, or Firm* — Buscher Patent PLLC

(57) ABSTRACT

The present invention relates to ophthalmic formulations wherein a synergistic combination of three different classes of disinfectants (a multimeric biguanide compound, a quaternary ammonium compound and an antifungal/anti-acanthamoeba compound, in particular a combination of polyhexamethylene biguanide, Polyquaternium-1 and myristamidopropyl dimethylamine) enables the use of high concentrations of hyaluronate for providing better comfort and support of corneal health without compromising antimicrobial efficacy. The novel ophthalmic formulations support the use of more than 7.5 times higher concentrations of hyaluronate than are present in currently marketed multipurpose disinfection solutions.

22 Claims, No Drawings

(56) References Cited

OTHER PUBLICATIONS

L. Liu et al., "Microbial production of hyaluronic acid: current state, challenges, and perspectives," *Microbial Cell Factories*, 10:99, pp. 1-9 (Dec. 24, 2011).

H. Lorentz et al., "Contact lens physical properties and lipid deposition in a novel characterized artificial tear solution," *Molecular Vision*, 17:3392-3405 (2011).

T. Nishida et al., "Hyaluronan Stimulates Corneal Epithelial Migration," *Exp. Eye Res.*, 53:753-758 (1991).

H. Oh et al., "Effect of Hypotonic 0.18% Sodium Hyaluronate Eyedrops on Inflammation of the Ocular Surface in Experimental Dry Eye," *J. Ocular Pharmacology and Therapeutics*, vol. 30, No. 7, pp. 533-542 (2014).

K. Ohkura et al., "Bridge-linked bis-quaternary ammonium antimicrobial agents: relationship between cytotoxicity and antibacterial activity of 5,5'-[2,2'-(tetramethylenedicarbonyldioxy)-diethyl]bis(3-alkyl-4-methylthiazonium iodide)s," *Bioorganic & Medicinal Chemistry*, 13:2579-2587 (2005).

T. Paimela et al., "The preservative polyquaternium-1 increases cytotoxicity and NF-kappaB linked inflammation in human corneal epithelial cells," Molecular Vision, 18:1189-1196 (2012).

P. Pellinen et al., "The Cytotoxic Effects of Preserved and Preservative-Free Prostaglandin Analogs on Human Corneal and Conjunctival Epithelium In Vitro and the Distribution of Benzalkonium Chloride Homologs in Ocular Surface Tissues In Vivo," *Current Eye Research*, 37(2):145-154 (2012).

L. Pignataro et al., Topically administered hyaluronic acid in the upper airway: A narrative review, *International Journal of Immunopathology and Pharmacology*, vol. 32, pp. 1-7, 2018.

C. Romano et al., "Hyaluronic Acid and Its Composites as a Local Antimicrobial/Antiadhesive Barrier," *J. Bone Joint Infect.*, 2:63-72 (2017).

N. Saeed et al., "Effectiveness of Sodium hyaluronate eye gel in patients with dry eye disease: A multi-centre, open label, uncontrolled study," *Pak. J. Med. Sci.*, 2013 29(4):1055-1058.

P. Saranraj et al., "Hyaluronic Acid Production and its Applications—A Review," *International Journal of Pharmaceutical & Biological Archives*, 2013; 4(5):853-859.

D. Scudiero et al., "Evaluation of a Soluble Tetrazolium/Formazan Assay for Cell Growth and Drug Sensitivity in Culture Using Human and Other Tumor Cell Lines," *Cancer Research*, 48:4827-4833 (Sep. 1, 1988).

A. Shiedlin et al., "Evaluation of Hyaluronan from Different Sources: *Streptococcus zooepidemicus*, Rooster Comb, Bovine Vitreous, and Human Umbilical Cord," Biomacromolecules, 5:2122-2127 (2004).

R. Stern et al., "Hyaluronan fragments: An Information-rich system," *European Journal of Cell Biology*, 85:699-715 (2006).

J. Sze et al., "Biotechnological production of hyaluronic acid: a mini review," 3 *Biotech.*, 6:67, pp. 1-9 (2016).

S. Torretta et al., "Topical administration of hyaluronic acid in children with recurrent or chronic middle ear inflammations," *International Journal of Immunopathology and Pharmacology*, 2016, vol. 29(3) pp. 438-442.

W. Wu et al., "The Protective Role of Hyaluronic Acid in Cr(VI)-Induced Oxidative Damage in Corneal Epithelial Cells," *Journal of Ophthalmology*, Article ID 3678586, vol. 2017, 6 pages.

M. Yamamoto et al., "In Vitro Evaluation of the Biocompatibility of Newly Synthesized Bis-Quaternary Ammonium Compounds with Spacer Structures Derived from Pentaerythritol of Hydroquinone," *Biocontrol Science*, vol. 21, No. 4, pp. 231-241 (2016).

I. You et al., "Comparison of 0.1%, 0.18%, and 0.3% Hyaluronic Acid Eye Drops in the Treatment of Experimental Dry Eye," *Journal of Ocular Pharmacology and Therapeutics*, vol. 34, No. 8, pp. 557-564 (2018).

X. Zheng et al., "Comparison of In Vivo Efficacy of Difference Ocular Lubricants in Dry Eye Animal Models, " *IOVS*, vol. 55, No. 6, pp. 3454-3460 (2014).

X. Zheng et al., "In Vitro Efficacy of Ocular Surface Lubricants Against Dehydration," Cornea, vol. 32, No. 9, pp. 1260-1264 (Sep. 2013).

\* cited by examiner

HIGH HYALURONATE MULTI-PURPOSE DISINFECTION SOLUTIONS FOR OPHTHALMIC APPLICATIONS

FIELD OF THE INVENTION

The invention relates to novel multi-purpose disinfection solutions for ophthalmic uses.

BACKGROUND

Multi-purpose solutions for cleaning and disinfection of contact lenses, referred to as multi-purpose disinfections solutions (MPDS), are convenient because they permit lenses to be cleaned in a single operation: neutralization of the cleaning solution is not required, and the lenses do not need to be rinsed as they must be, e.g., with hydrogen peroxide-based products. An MPDS must thoroughly clean as well as effectively disinfect a contact lens. Furthermore, it should provide comfort during contact lens wear. The aspect of comfort has gained particular attention recently as changes in the work environment, e.g., the extensive use of screens and smartphones, exposure to air conditioning, etc., have increasingly led to issues with dry and irritated eyes. These symptoms are often aggravated in contact lens wearers. This condition that is known as "Contact Lens-Associated Dry Eye" can cause patients to discontinue the use of contact lenses (Brafman and Eiden. Review of Cornea & Contact Lenses, JAN/FEB 2012, pp. 18-21). Hyaluronic acid (HA) is frequently used as a rewetting and comfort agent in ophthalmic formulations and compositions. HA is a naturally occurring polymer composed of glucuronic acid and N-acetyl-D-glucosamine repeat units. HA has usually a high molecular weight (up to millions of Daltons) in mammals and is present in the extracellular matrix, epithelium, neural and connective tissue as well as in the vitreous of the eye (Stern et al. Eur. J. Cell Biol. (2006) 85: 699-715; Saranraj et al. Int. J. Pharma. Biol. Sci. Arch. (2013) 4: 853-859). Over the past decades, several positive aspects of the supplementation with HA in cosmetic and, particularly, ophthalmic products were discovered. Owing to its high capacity for absorbing water (Holban & Grumezescu. Elsevier (2016). ISBN: 9780323477222), HA increases the wettability and lubricity of the corneal surface and positively influences the stability of the tear film, resulting in a reduced rate of tear film evaporation and an increased tear breakup time (Zheng et al. Cornea. (2013) 32:1260-1264; Invest. Ophthalmol. Vis. Sci. (2014) 55: 3454-60; Saeed et al. Pak. J. Med. Sci. (2013) 29: 1055-1058; You et al. J. Ocul. Pharmacol. Th. (2018) 34: 557-564; Oh et al. J. Ocul. Pharmacol. Th. (2014) 30: 533-542) These aspects are predominantly responsible for a "feeling" of comfort and a reduction of dry eye-like conditions. Furthermore, HA can function as radical scavenger and prevent damage caused by reactive oxygen species (ROS). HA is known to promote corneal cell migration and corneal re-epithelialization and is active in various wound-healing processes. Furthermore, the polymer has been reported to protect corneal epithelial cells against damage from detergents such as sodium lauryl sulfate and surfactants such as benzalkonium chloride (Wu et al. J. Ophthalmol. (2017) Article ID 3678586; Nishida et al. (1991) Exp. Eye Res. 53: 753-758; Saranraj et al. (2013) Int. J. Pharm. Biol. Sci. Arch. 4: 853-859; Carlson et al. (2018) J. Ocul. Pharmacol. Th. 34: 360-364). However, some of the physico-chemical properties that are responsible for the latter positive effects also interfere with the use of HA in MPDS. Whereas elevated effective concentrations of HA can, for instance, be used in preservative-free artificial tear solutions, the same concentrations will inhibit the antimicrobial effects of commonly used disinfectants such as quaternary ammonium compounds in MPDS. This inhibition occurs because HA is an anionic polymer that can form complexes with cationic disinfectants, resulting in their aggregation and inactivation (U.S. Pat. Nos. 8,119,112 5,858,346 and 5,559,104). In principle, inhibitory effects of HA may be compensated by increasing the concentrations of disinfectants. However, such compensation may not be achieved readily as disinfectants are cytotoxic at elevated concentrations. (Pellinen et al. Curr. Eye Res. (2012) 37: 145-154; Paimela et al. Molecular Vision (2012) 18: 1189-1196). It is therefore not surprising that the concentration of HA in marketed MPDS typically does not exceed about 0.01% (w/v). Because comforting effects are expected to increase with concentration, the development of ophthalmic solutions that contain larger concentrations of HA should be an important goal (You et al. J. Ocul. Pharmacol. Th. (2018) 34: 557-564). The concept that higher HA concentrations would be beneficial is further supported by studies of Torretta et al. (Int. J. Immunopathol. Pharmacol. (2016) 29: 438-442) and Romano et al. (J. Bone Jt. Infect. (2017) 2: 63-72). The latter studies provided evidence that formation of biofilms by certain bacterial strains does not occur at elevated HA concentrations. It is noted that U.S. Pat. Nos. 8,119,112 and 8,664,180 propose that HA concentrations exceeding 0.01% w/v may be contained in MPDS. However, U.S. Pat. No. 8,664,180 does not explicitly teach such compositions, and U.S. Pat. No. 8,119,112, while describing MPDS having elevated concentrations of HA, only provides experimental evidence of adequate antimicrobial activity for a composition containing 0.01% w/v HA.

The present disclosure relates to MPDS that support higher concentrations of HA than are present in marketed MPDS, without compromising antimicrobial activity or cleansing efficacy.

SUMMARY OF THE INVENTION

The present invention relates to ophthalmic formulations wherein a synergistic combination of three different classes of disinfectants (a multimeric biguanide compound, a quaternary ammonium compound and an antifungal/anti-acanthamoeba compound), in particular a combination of polyhexamethylene biguanide, Polyquaternium-1 and myristamidopropyl dimethylamine, enables the use of high concentrations of hyaluronic acid for providing better comfort and support of corneal health without compromising antimicrobial efficacy. The novel ophthalmic formulations of this disclosure support the use of more than 7.5 times higher concentrations of hyaluronic acid than are present in currently marketed MPDS.

The solutions of the present invention may also preferably be referred to as ophthalmic formulations of the present invention, or the multipurpose disinfection solutions (MPDS) of the present invention.

Therefore, the present disclosure concerns MPDS for ophthalmic uses that comprise a multimeric biguanide compound, a quaternary ammonium compound and an antifungal/anti-acanthamoeba agent and hyaluronic acid or a salt of hyaluronic acid. The multimeric biguanide compound can be present in an amount from about 0.00005 to about 0.0005% weight/volume (w/v), the quaternary ammonium compound in an amount from about 0.00005 to about 0.0025% w/v and the antifungal/anti-acanthamoeba agent in an amount from about 0.00005 to about 0.0025% w/v. The antifungal/anti-acanthamoeba agent can be an amido-amine compound such as myristamidopropyl dimethylamine (MAPD) or chlorhexidine sulfonate. MAPD is preferred. The hyaluronic acid or hyaluronate is present in an amount that exceeds 0.01% w/v but is smaller than about 0.1% w/v. Preferred concentrations of the components of the MPDS of the present disclosure range from about 0.000075 to about 0.00025% w/v for the multimeric biguanide compound, from about 0.00005 to about 0.002% w/v for the quaternary ammonium compound, from about 0.00005 to about 0.002% w/v for the antifungal/anti-acanthamoeba agent and from about 0.0151% w/v to about 0.09% w/v for the hyaluronic acid or hyaluronate. More preferred concentrations are from about 0.0001 to about 0.0002, about 0.000075 to about 0.001, about 0.0001 to about 0.0018 and about 0.025 to about 0.085% w/v for the multimeric biguanide compound, the quaternary ammonium compound, the antifungal/anti-acanthamoeba agent and HA, respectively. The most preferred concentrations are from 0.00012 to 0.00016, 0.000085 to 0.00012, 0,0006 to 0.0014 and 0.04 to 0.08% w/v, respectively.

Amido-amine compound, as understood herein, is preferably defined as an amide of a fatty acid and diamine compound, formed from one fatty acid molecule and one diamine molecule. Amido-amine compounds of the present invention preferably contain an amide group —C(O)NH— and an amino group —NR$_2$, wherein each R independently is a hydrogen or an optionally substituted hydrocarbon. Fatty acid as understood herein relates preferably to an alkanoic acid, optionally containing one or more C═C bonds, and optionally substituted, in particular with —OH group. Preferably fatty acid has 2 to 30 carbon atoms. More preferably, fatty acid has 4 to 28 carbon atoms. Diamine molecule as defined herein preferably contains two amino groups, one of which may be optionally substituted with one or more C1-C4 alkyls, and an alkylene moiety with 1 to 10 carbon atoms.

The multimeric biguanide compound is selected from the group consisting of polyhexamethylene biguanide (PHMB), polyaminopropyl biguanide (PAPB) and 1,1'-hexamethylene-bis(5-[2-ethylhexyl]biguanide), and the quaternary ammonium compound is selected from the group consisting of Polyquaternium-1 (PQ-1), Polyquaternium-10 (PQ-10), Polyquaternium-42, N-dodecyl{4,4'-(2,4,8,10-tetraoxaspiro[5.5]undecan-3,9-diyl)}dipyridinium dibromide, 3,3'-[1,4-phenylenebis(oxy)]bis(1-dodecyl pyridinium)dibromide, 3-(3-hydroxy-2-(hydroxymethyl)-2-{[(1-dodecylpyridinium-3-yl)oxy]methyl}propoxy)-1-dodecylpyridinium dibromide, 5,50-[2,20-(tetramethylenedicarbonyldioxy)diethyl]bis(3-alkyl-4-methylthiazolium iodide) and [4,40-(1, 6-hexamethylenedithio)bis(1-octylpyridiniumiodide). The most preferred biguanide compound is PHMB and the most preferred quaternary ammonium compound PQ-1. Preferably, polyhexamethylene biguanide (PHMB) may also be referred to as poly(hexamethylene biguanide). Further preferably, each compound as described herein is understood as the compound or a pharmaceutically acceptable salt thereof. Thus, for example, the term polyhexamethylene biguanide (PHMB) is preferably herein understood as polyhexamethylene biguanide (PHMB) or a pharmaceutically salt thereof.

The multimeric biguanide compound, as understood herein, is preferably defined as a compound containing more than one biguanide moiety —NH—C(═NH)—NH—C(═NH)—NH—, more preferably it is defined as a compound comprising a repeating unit, which comprises a biguanide moiety —NH—C(═NH)—NH—C(═NH)—NH—. The multimeric biguanide compound as defined herein may also refer to a pharmaceutically acceptable salt of a compound, as defined herein.

Preferably, any compound described herein may also be present as a pharmaceutically acceptable salt. "Pharmaceutically acceptable salts" are preferably defined as derivatives of the described compounds wherein the parent compound is modified by making acid or base salts thereof. Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as, but not limited to, hydrochloric, hydrobromic, sulfuric, sulfamic, phosphoric, nitric and the like; and the salts prepared from organic acids such as, but not limited to, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic, and the like. The pharmaceutically acceptable salts of the present invention can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two. Organic solvents include, but are not limited to, nonaqueous media like ethers, ethyl acetate, ethanol, isopropanol, or acetonitrile. Lists of suitable salts can be found in Remington's Pharmaceutical Sciences, 18$^{th}$ ed., Mack Publishing Company, Easton, PA, 1990, p. 1445, the disclosure of which is hereby incorporated by reference.

The MPDS of the present disclosure comprise one or more, more typically most or all of the following additional components:

a chelating agent at a concentration of about 0.01-0.06% w/v, a buffer or buffering agent at a concentration of about 0.01-1% w/v, a viscosity-modifying agent at a concentration of about 0.01-0.25% w/v, a surface-active compound at a concentration of about 0.01-1% w/v, a tonicity agent at a concentration of about 0.001-1% w/v and a calcium and/or magnesium salt, e.g., MgCl$_2$ and/or CaSO$_4$, each at a concentration of about 0.001-0.015% w/v. Preferably, the MPDS of the present disclosure comprise one or more, more typically most or all of the following additional components:

a chelating agent at a concentration of about 0.01-0.06% w/v, a buffer or buffering agent at a concentration of about 0.01-1% w/v, a viscosity-modifying agent at a concentration of about 0.01-0.25% w/v, a surface-active compound at a concentration of about 0.01-1% w/v, a tonicity agent at a concentration of about 0.001-1% w/v and optionally a calcium and/or magnesium salt, e.g., MgCl$_2$ and/or CaSO$_4$, each at a concentration of about 0.001-0.015% w/v. Most preferred are ethylenediaminetetraacetic (EDTA) as the chelating agent, a borate buffer as the buffering agent, hydroxypropylmethyl cellulose (HPMC) as the viscosity-modifying agent (additional preferred compounds being carboxymethyl cellulose (CMC) and hydroxyethyl cellulose), a poloxamine as the surface-active agent and sodium chloride or a combination of sodium chloride and potassium chloride as the tonicity agent.

Preferably, the multipurpose disinfection solution of the present invention may further comprise one or more of a chelating agent in an amount ranging from about 0.01% w/v to about 0.06% w/v, a buffer in an amount ranging from about 0.01% w/v to about 1% w/v, a viscosity-modifying agent in an amount ranging from about 0.01% w/v to about 0.25% w/v, a surface-active compound in an amount ranging from about 0.01% w/v to about 1% w/v, a tonicity agent in an amount ranging from about 0.001% w/v to about 1% w/v, a calcium salt in an amount ranging from about 0.001% w/v to about 0.015% w/v and a magnesium salt in an amount ranging from about 0.001% w/v to about 0.015% w/v.

DETAILED DESCRIPTION OF THE INVENTION

The present invention relates to a novel multi-purpose disinfection solution (MPDS) that can be used for the cleaning, disinfection and storage of contact lenses. Applicant discovered that in an MPDS containing disinfectants from the two classes typically used in MPDS, i.e., multimeric biguanide compounds and quaternary ammonium compounds, the concentration of hyaluronate (HA) that is included as a wetting, lubricating and corneal support agent cannot be significantly increased beyond 0.01% w/v without loss of effective antimicrobial activity. It is noted again that Biotrue from Bausch & Lomb, a typical MPDS of this type, contains HA at 0.01% w/v. Presumably, a higher concentration of HA in such an MPDS is not tolerated due to the concentration-dependent inactivation of the cationic disinfectants by HA.

It was surprisingly found that the addition of a disinfectant of a third class, i.e., an antifungal/anti-acanthamoeba agent, effectively counteracts the negative effect of HA on antimicrobial activity of the MPDS. Appropriate antimicrobial activity is maintained at HA concentrations that are 7.5 times higher than that used in marketed MPDS.

Hence, the MPDS formulations of the present disclosure comprise three types of disinfectants, a multimeric biguanide compound, a quaternary ammonium compound and an antifungal/anti-acanthamoeba agent. The multimeric biguanide compound can be, but is not limited to, polyhexamethylene biguanide (PHMB), polyaminopropyl biguanide (PAPB), or 1,1'-hexamethylene-bis(5-[2-ethylhexyl]biguanide) (alexidine dihydrochloride). A preferred multimeric biguanide compound is PHMB. A typical concentration range for the multimeric biguanide compound (or a suitable salt thereof) is about 0.00005-0.0005% (w/v). Preferably, the compound is present in a concentration of about 0.000075-0.00025% (w/v). A more preferable range is about 0.0001-0.0002% (w/v) and most preferably is about 0.00012-0.00016% (w/v). Most preferably, the compound is present in a concentration of about 0.00015% (w/v).

Suitable quaternary ammonium compounds include, but are not limited to, Polyquaternium-1 (PQ-1; also known as Polyquad (Alcon)), Polyquaternium-10 (PQ-10) and Polyquaternium-42 (PQ-42). These compounds may preferably also be referred to as preferred quaternary ammonium compounds. Additional suitable quaternary ammonium compounds are N-dodecyl{4,4'-(2,4,8,10-tetraoxaspiro[5.5] undecan-3,9-diyl)}dipyridinium dibromide (4TOSU-12), 3,3'-[1,4-phenylenebis(oxy)]bis(1-dodecylpyridinium)dibromide (3PHBO-12); 3-(3-hydroxy-2-(hydroxymethyl)-2-{[(1-dodecylpyridinium-3-yl)oxy]methyl}propoxy)-1-dodecylpyridinium dibromide (3HHDMP-12), 5,50-[2,20-(tetramethylenedicarbonyldioxy)diethyl]bis(3-alkyl-4-methylthiazolium iodide) (5DEBT-4,8) and [4,40-(1,6-hexamethylenedithio)bis(1-octylpyridiniumiodide)] (4DTBP-6,8) (Yamamoto et al. Biocontrol science (2016) 21: 231-241; Ohkura et al. Bioorganic & Medicinal Chemistry (2005) 13: 2579-2587). Polyquaternium compounds are described, e.g., in Iwata et al. Springer Science & Business Media. 2012 Oct. 2. ISBN 9784431540618. For the quaternary ammonium compound (QAC) (or a suitable salt thereof), the typical range is about 0.00005-0.0025% (w/v) Preferably, the concentration is from about 0.00005 to about 0.0020% (w/v), more preferably from about 0.000075 to about 0.001% (w/v) and most preferably from about 0.000085 to about 0.00012% (w/v). Even more preferably, the concentration is about 0.00010% (w/v). Due to their lower cytotoxicity and allergenic potential, multimeric QAC having several repeat units of a quaternary ammonium group are preferred over monomeric QACs. From this subclass, the most preferred multimeric QAC is Polyquaternium-1 (PQ-1). In some embodiments, so-called bis-QAC such as (4TOSU-12) having two quaternary ammonium groups in the same entity may be employed since they have higher activities and better biocompatibilities than conventional monomeric QAC. Mixtures of a bis-QAC and PQ-1 may also be suitable for the ophthalmic formulations of this disclosure.

Preferably, polyquaternium-1 is herein understood as a compound according to the CAS number 75345-27-6. Polyquaternium-1 as defined herein is commercially available at Biosynth Carbosynth (FP163582).

Preferably, polyquaternium-10 is herein understood as a compound or a composition according to the CAS number 68610-92-4. Polyquaternium-10 as defined herein is commercially available at Merck KGaA (525944).

Preferably, polyquaternium 42 is herein understood as a compound or a composition according to the CAS number 31512-74-0. Polyquaternium-42 as defined herein is commercially available at Biosynth Carbosynth (FP59606).

A suitable antifungal/anti-acanthamoeba agent is myristamidopropyl dimethylamine (MAPD; also known as Aldox (Alcon)) or other amido-amine compound, or chlorhexidine gluconate. Most preferred is MAPD/Aldox. The antifungal/anti-acanthamoeba agent is typically included in an MPDS of the present disclosure at a concentration of about 0.00005 to about 0.0025% (w/v). Concentrations preferably range from about 0.00005 to about 0.0020% (w/v), more preferably from about 0.0001 to about 0.0018% (w/v) and most preferably from about 0.0006 to about 0.0014% (w/v). Even more preferably, a concentration is 0.00120% (w/v).

The HA (as the free acid or an acceptable salt thereof) utilized in the ophthalmic formulations of the present disclosure has usually a molecular weight from about 50,000 to about 2 million Daltons (2 MDa), preferably from about 0.4 to about 1.8 MDa and most preferably from about 1.2 to about 1.8 MDa. As understood herein, the molecular weight of the HA preferably refers to a weight average molecular weight, determined as discussed below Molecular weight of HA was determined using a gel permeaction chromatography (GPC) method with a pullulan standard using the following protocol. A stock solution of 3 mg/mL hyaluronic acid was prepared in elution buffer (deionized water containing 0.05% (w/v) NaN3. Subsequently, 0.4 mL of stock solution was injected in the port of the tempered GPC device (1260 Infinity LC-System, Agilent, Santa Clara, CA). Chromatography was performed at a constant flow rate of 1.0 mL/min in elution buffer. Hyaluronic acid samples were separated on a Suprema two-column system (pre-column, linear XL; 5 μm particle size; PSS, Mainz, Germany) which was placed in an external column oven at 55° C. Copolymers were analyzed by RI (refractive index) and UV detectors. A calibration curve (10 points) was established using a pullulan standard obtained from PSS (Mainz, Germany), including the following 10 polymers (Mw, Mn and PDI are given): (1) Mw: 342/Mn: 342, PDI 1.0; (2) Mw: 1320/Mn: 1080, PDI 1.23; (3) Mw: 6200/Mn: 5900, PDI 1.05; (4) Mw: 10000/Mn: 9200, PDI 1.09; (5) Mw: 21700/Mn: 20000, PDI 1.09; (6) Mw: 48800/Mn 45500, PDI 1.07; (7) Mw: 113000/Mn: 100000, PDI 1.13; (8) Mw: 210000/Mn 189000, PDI 1.11; (9) Mw: 366000/Mn 318000, PDI 1.15; (10) Mw: 805000/Mn: 636000, PDI: 1.27. Molecular weights of characterized copolymers were estimated with reference to this standard. To this end, weight average molecular weight of the polymer (Mw), number average molecular weight of the polymer (Mn) and its PDI are determined based on GPC measurements by the software PSS WinGPC Unichrom V:8.1 Build 2827 (PSS; https://www.pss-polymer.com/).

The concentration of HA is typically greater than 0.01% w/v and smaller than 0.1% w/v. Preferably it is from about 0.0151 to 0.09% (w/v), more preferably from about 0.025 and 0.085% (w/v) and most preferably from about 0.04 to about 0.08% (w/v). In order to maximize the safety of the ophthalmic formulation, the HA is preferably derived from a biotechnology process, e.g., produced by fermentation with bacteria or in a cell-free system using suitable enzymes.

HA is currently produced at an industrial scale either by extraction from animal tissues, mainly rooster combs, or via large-scale fermentation employing genetically modified bacterial strains (Liu et al. Microb. Cell Fact. (2011) 10: 99). Both processes have their advantages but, from a safety perspective, biotechnological methods are preferred for producing HA that is used in a medical device such as a lens care solution. Extraction from animal tissue requires harsh conditions (grinding, acid treatment, use of organic solvents, etc.) and leads to partial degradation of HA, increasing the polydispersity index (PDI) of the polymer. As a consequence, batch-to-batch variability may be elevated (Boeriu et al. Int. J. Carbohydr. Chem. (2013) vol. 2013, Article ID 624967). Furthermore, HA from an animal source may be still bound to animal proteins and may, depending on the source, further contain nucleic acids, prions as well as viruses with the attendant risk of immune reactions or transmission of diseases (Shiedlin et al. (2004) Biomacromolecules 5: 21222-2127). HA derived from biotechnological processes may be less likely to be contaminated. The presence of endotoxins may be avoided by the use endotoxin-free strains such as B. subtilis. Furthermore, HA produced by biotechnology has a lower PDI compared to tissue-extracted HA, provided that culture conditions are carefully monitored and controlled. To date, HA of molecular weights of up to 2 MDa can be produced by fermentation. Cell-free systems using isolated enzymes yield HA with molecular weights of up to 1-2 MDa. The latter molecular weight ranges are well suited for ophthalmic formulations because HA of high molecular weights have large capacities for absorbing water and, due to their elevated viscosities, remain longer on the contact lens/eye surface than HA of smaller molecular sizes (Sze et al. Biotech. (2016) 6: 67 and references cited therein).

MPDS of the present disclosure typically also comprise a buffer component. The type and amount of buffer is selected so that the MPDS composition meets the required performance criteria such as physicochemical attributes and shelf life stability, antimicrobial efficacy, buffer capacity and the like factors. The buffer is also selected to provide a pH that is compatible with the target tissue of the eye as well as any contact lens with which the composition is intended to be used. Suitable may be borate, citrate, histidine, tris, tris/glycine or bis-tris buffers and combinations thereof. Suitable may further be phosphate. Preferably, the buffer is borate, phosphate, citrate, histidine, tris, tris/glycine, bis-tris buffers or combinations thereof. Generally, for an ophthalmic formulation, a pH close to that of human tears, such as a pH of about 7.5, is very useful, although wider pH ranges from about 6.0 to about 8.0, more preferably from about 6.2 to about 7.8 and still more preferably from about 7.0 to about 7.7 are also acceptable. Buffer substances are typically present at concentrations between about 0.01% w/v and about 1% w/v.

The ophthalmic formulations of this disclosure which are intended to effectively clean contact lenses typically comprise one or more surface-active substances. Useful surface-active substances are, but are not limited to, poloxamers (nonionic triblock copolymers composed of a central hydrophobic chain of polypropylene oxide (PPO) flanked by two hydrophilic chains of polyethylene oxide (PEO)), poloxamines (nonionic copolymers having an ethylenediamine core whose amine groups are substituted with chains of PPO/PEO of variable lengths and compositions) or substances of the polysorbate type (oily liquids derived from ethoxylated sorbitan (a derivative of sorbitol) esterified with various fatty acids).

Inclusion of such surface-active substances results in effective lens cleaning during lens treatment without substantially affecting the antimicrobial activity of the MPDS compositions. The concentration of surface-active substances in the formulations typically ranges from about 0.01% w/v to about 1% (w/v). Poloxamines are preferred. Examples of poloxamines are Tetronic 90R4, Tetronic 701, Tetronic 1304 and Tetronic 1107. Preferably, poloxamines are Tetronic 90R4, Tetronic 1304 and Tetronic 1107. The cleaning characteristics of poloxamines differ depending on PEO/PPO ratio and molecular weight, respectively.

Tetronic 90R4 is preferably defined as a compound or a composition according to the CAS number 26316-40-5, which is available from Sigma Aldrich under the catalogue number 435546. Preferably, number average molecular weight of Tetronic 90R4 is 7200 Da.

Tetronic 701 is preferably defined as a compound or a composition according to the CAS number 26316-40-5, which is available from Sigma Aldrich under the catalogue number 435511. Preferably, number average molecular weight of Tetronic 701 is 3600 Da.

Tetronic 1304 is preferably defined as a compound or a composition according to the CAS number 26316-34-5. Preferably, number average molecular weight of Tetronic 1304 is 10500 Da.

Tetronic 1107 is preferably defined as a compound or a composition according to the CAS number 26316-40-5. Preferably, number average molecular weight of Tetronic 1107 is 15000 Da.

The presently disclosed MPDS formulations typically comprise a chelating agent or a mixture of chelating agents. Such chelating agents should be capable of interacting with calcium and magnesium ions as well as with residual heavy metal ions that are sometimes present in contact lenses. They should further be compatible with ophthalmic or medical applications. Suitable chelating agents are, but are not limited to, ethylenediaminetetraacetic acid (EDTA), tetrasodium N,N-bis(carboxymethyl)-L-glutamate (GLDA), tetrasodium iminodisuccinate, trisodium N-(1-carboxylatoethyl) iminodiacetate (MGDA), (1,4,7,10-tetraazacyclododecane-1,4,7,10-tetraaceticacid) (DOTA), diethylenetriaminepentaacetic acid (DTPA), triethylenetetramine-N,N,N',NN''',N'''-hexaacetic acid (TTHA) and citrate. EDTA and GLDA are preferred because they are excellent chelating agents as well as possess good water solubility. GLDA is readily biodegraded. The concentration of chelating agents in the formulations typically ranges from about 0.01% w/v to about 0.06% w/v. It is noted that marketed MPDS, e.g., Biotrue of Bausch & Lomb, contain higher chelator levels. The MPDS of the present disclosure can also comprise low concentrations of calcium and/or magnesium salts at concentrations from about 0.001% w/v to about 0.015% w/v, whereby the combined molar amounts of the added divalent cations are below that of the chelating agent employed in the same formulation.

The osmolarity of the presently disclosed ophthalmic formulations may be adjusted with tonicity agents. Examples of suitable tonicity agents are, but not limited to, chloride salts of sodium, potassium, calcium and magnesium, dextrose, glycerol, propylene glycol, sugars such as sorbitol, mannitol, amino acids such as glycine, and mixtures of these agents. Preferred tonicity agents are sodium chloride or combinations of sodium chloride and potassium chloride, which agents may be combined with mannitol, sorbitol or glycine to increase buffering or radical scavenging capacity. Tonicity agents are typically used in amounts ranging from about 0.001% w/v to about 1% w/v. Preferably, a tonicity agent(s) will be employed in an amount that results in a final osmotic value of between about 220 and 380 mOsm/kg, more preferably between about 240 and 320 mOsm/kg and most preferably between about 280 and 310 mOm/kg.

Viscosity-modifying agents that may be comprised in the formulations of the present disclosure include cellulose polymers (including hydroxypropylmethyl cellulose, hydroxyethyl cellulose, ethylhydroxyethyl cellulose, hydroxypropyl cellulose, methyl cellulose, carboxymethyl cellulose), glycerol, carbomers, polyethylene glycol, polyvinyl alcohol, polyvinyl pyrrolidone, poly(acryloyl-lysine) or copolymers containing side chain-acrylated amino acids, alginates, carrageenans, galactomannan polysaccharides (guar), karaya, agarose, locust bean, tragacanth and xanthan gums. Viscosity-modifying agents are employed in an amount effective to provide a desired lubricating effect. The concentration of these agents will typically be between about 0.01 and 0.25% w/v. Preferred viscosity-modifying agents are hydroxypropylmethyl cellulose (HPMC), carboxymethyl cellulose (CMC) and hydroxyethyl cellulose (HEC). Most preferred is HPMC which is also an excellent wetting agent. HPMC is sold, e.g., by the 'The Dow Chemical Company' ("Dow") under the trademark METHOCEL. Multiple types are available that differ in their degree of functionalization with methoxyl/hydroxypropyl groups as well as molecular weight. An appropriate type of HPMC (or other viscosity-modifying agent) may be selected to achieve the desired viscosity that typically lies between about 0.5 and about 4 millipascal-second (mPa·s), preferably between about 1.0 and about 3.5 mPa·s, more preferably between about 1.25 and about 3.25 mPa·s, and most preferably between about 2.0 and about 2.8 mPa·s.

Determination of viscosity as referred to herein was performed using a spindle viscosimeter. For this 300 mL of the sample solution was poured into a 500 mL glass beaker and tempered in a water bath at 23° C. for 30 minutes. The viscosity was determined using a Brookfield Viscometer (DV-II, 60 rpm, spindle 1, 23° C.).

Typical MPDS formulations according to the present disclosure are described in Table 1 and 2. As known to the skilled person, the formulations of the present invention are preferably obtainable by mixing and diluting aqueous stock solutions of each of the components. Skilled person is aware that in the case of hydrophobic agents, for example like Aldox, an ethanol stock solution may be preferably prepared for adding the hydrophobic agent to the aqueous formulation.

TABLE 1

Example formulations borate-based buffer system

| | Concentrations of components (% w/v) | | | | | |
|---|---|---|---|---|---|---|
| Component | Ex. 1 | Ex. 2 | Ex. 3 | Ex. 4 | Ex. 5 | Ex. 6 |
| PHMB | 0.0001 | 0.0002 | — | 0.00015 | 0.00015 | 0.00015 |
| PAPB | — | — | 0.0002 | — | — | — |
| PQ-1 | 0.001 | 0.000075 | 0.0001 | — | 0.0001 | 0.0001 |
| PQ-10 | — | — | — | 0.0001 | — | — |
| MAPD | 0.0018 | 0.0001 | 0.0012 | 0.0012 | 0.0012 | 0.0012 |
| HA | 0.025 | 0.085 | 0.075 | 0.075 | 0.075 | 0.075 |
| EDTA | 0.01 | 0.06 | — | 0.04 | — | 0.03 |
| GLDA | — | — | 0.06 | — | 0.04 | — |
| HPMC | 0.01 | 0.25 | — | 0.075 | 0.1 | — |
| CMC | — | — | 0.25 | — | — | 0.075 |
| Tetronic 90R4 or 701 | 0.05 | 1 | — | 0.1 | — | 0.1 |
| Tetronic 1304 | — | — | 0.1 | — | 0.1 | — |
| MgCl$_2$ | 0.001 | 0.015 | 0.0015 | 0.0015 | 0.003 | — |
| CaCl$_2$ | 0.001 | — | 0.0015 | 0.0015 | — | — |
| Borate buffer | 0.05 | 1 | 0.4 | 0.4 | 0.4 | 0.4 |
| NaCl/KCl | | | 0.52 | | | |

TABLE 2

Example formulations phosphate-based buffer system

| | Concentrations of components (% w/v) | | | | | |
|---|---|---|---|---|---|---|
| Component | Ex. 7 | Ex. 8 | Ex. 9 | Ex. 10 | Ex. 11 | Ex. 12 |
| PHMB | 0.0001 | 0.0002 | — | 0.00015 | 0.00015 | 0.00015 |
| PAPB | — | — | 0.0002 | — | — | — |
| PQ-1 | 0.001 | 0.000075 | 0.0001 | — | 0.0001 | 0.0001 |
| PQ-10 | — | — | — | 0.0001 | — | — |
| MAPD | 0.0018 | 0.0001 | 0.0012 | 0.0012 | 0.0012 | 0.0012 |
| HA | 0.03 | 0.05 | 0.05 | 0.035 | 0.06 | 0.075 |
| EDTA | 0.01 | 0.06 | — | 0.04 | — | 0.03 |
| GLDA | — | — | 0.06 | — | 0.04 | — |
| HPMC | 0.01 | 0.25 | — | 0.075 | 0.1 | — |
| CMC | — | — | 0.25 | — | — | 0.075 |
| Tetronic 90R4 or 701 | 0.05 | 1 | — | 0.1 | — | 0.1 |
| Tetronic 1304 | — | — | 0.1 | — | 0.1 | — |
| Sodium phosphate (dibasic/monobasic) | 0.4/0.14 | 0.4/0.14 | 0.4/0.14 | 0.2/0.07 | 0.3/0.05 | 0.4/0.14 |
| NaCl/KCl | | | 0.48 | | | |

The present invention, thus generally described, will be understood more readily by reference to the following examples, which are provided by way of illustration and are not intended to be limiting of the present invention.

EXAMPLES

Example 1: Efficacy of Antimicrobial Preservation According to ISO 14729

In an attempt to obtain MPDS that provide higher patient comfort, formulations A and B were prepared that are based on the same multimeric biguanide and quaternary ammonium compounds that are employed in marketed MPDS but contain HA at a 50% higher concentration (Table 3). These formulations were tested for their ability to inactivate microbial growth according to an ISO 14729 testing protocol using MPDS Biotrue that comprises 0.01% (w/v) HA as a positive control for the testing procedure. Note that a spiral plate method was used for cell counting.

TABLE 3

Formulations tested:

| Formulation | Disinfectants | HA (% w/v) |
|---|---|---|
| A* | PHMB 0.00015% w/v; PQ-1 0.001% w/v | 0.0151 |
| B* | PHMB 0.00015% w/v; Alexidine dihydrochloride 0.00017% w/v | 0.0151 |
| C* | PHMB 0.00015% w/v; PQ-1 0.001% w/v; MAPD 0.0012% w/v | 0.0151 |
| D* | PHMB 0.00015% w/v, PQ-1 0.0001% w/v; MAPD 0.0012% w/v | 0.0151 |
| E* | PHMB 0.00015% w/v, PQ-1 0.0001% w/v; MAPD 0.0012% w/v | 0.0750 |
| F** | PHMB 0.00015% w/v, PQ-1 0.0001% w/v; MAPD 0.0012% w/v | 0.0300 |
| Biotrue | PHMB 0.00012% w/v, PQ-1 0.0001% w/v | 0.0100 |

*Formulations A-E further comprise boric acid (0.1% w/v), di-sodium tetraborate decahydrate (0.3% w/v), HPMC (0.08% w/v), Tetronic 90R4 (0.1% w/v), EDTA (sodium salt dihydrate - 0.04% w/v), potassium chloride (0.04% w/v), sodium chloride (0.5% w/v), calcium chloride dihydrate (0.002% w/v) and magnesium sulfate heptahydrate (0.002% w/v); pH 7.5 (adjusted by addition of 32% w/w aqueous solution of HCl).
**Formulation F further comprises sodium phosphate monobasic (monohydrate, final concentration of 0.1% w/v), sodium phosphate dibasic (heptahydrate, final concentration of 0.4% w/v), HPMC (0.08% w/v), Tetronic 90R4 (0.1% w/v), EDTA (sodium salt dihydrate - 0.04% w/v), potassium chloride (0.04% w/v), sodium chloride (0.5% w/v); pH 7.5 (adjusted by addition of 20% w/w aqueous solution of NaOH).

The latter components are present at concentrations as indicated in parentheses that are within the ranges as described above.

Test solutions containing at least 10 ml of a formulation per challenge organism were inoculated with a suitable number of challenge organisms sufficient to provide a final count of between $1.0 \times 10^5$ and $1.0 \times 10^6$ cfu/ml and subsequently incubated at 20-25° C. for up to 32 h. At 2, 4, 6 and 8 hours an aliquot of 1 ml of solution was withdrawn and analyzed for residual content of live microbes using a spiral plate method. This method has a detection limit of $10^2$ microbes (i.e., if, at the time of inoculation, the microbial count is $10^6$, the maximal detectable log reduction will be 4.0). In the case of the yeast and fungal challenges (*C. albicans* & *F. solani*), an additional sample was taken after 32 h. Typical test results are shown in Table 4. The symbol ">" in Table 4 indicates that no colony-forming units (CFU) were observed.

The determination of the viable count of organism and determination of log reduction was performed according to ISO 14729 (First edition 2001-04-15) with the exception that a spiral plate method (Gilchrist et al. Appl Microbiol. 1973 February; 25(2):244-52) was used for recovery of challenge organism. Colony forming units (Cfu) were recorded only on countable plates. As defined herein, countable plates refer to plates having from 30 cfu/plate to 300 cfu/plate for bacteria and yeast, and from 8 cfu/plate to 80 cfu/plate for molds. The average number of (cfu) on countable plates (triplicates) was recorded and microbial reduction at the specified time points [2,4,6,8 h (bacteria) or 2,4,6,8,32 h (yeast, molds)] were calculated by allocation with the inoculation value for the respective challenge organism.

TABLE 4

Antimicrobial activities of formulations

| Test organism | Formulation | [2 h] Log reduction | [4 h] Log reduction | [6 h] Log reduction | [8 h] Log reduction | [32 h] Log reduction |
|---|---|---|---|---|---|---|
| *Staphylococcus aureus* ATCC 6538 | A | >3.51 | >3.51 | >3.51 | >3.51 | |
| | B | 0.75 | 1.03 | 1.56 | 2.20 | |
| | C | 3.26 | >3.26 | >3.26 | >3.26 | |
| | D | >3.18 | >3.18 | >3.18 | >3.18 | |
| | E | 2.18 | >3.18 | >3.18 | >3.18 | |
| | F | 2.27 | 3.23 | >3.23 | >3.23 | |
| | Biotrue | >3.51 | >3.51 | >3.51 | >3.51 | |
| *Pseudomonas aeruginosa* ATCC 9027 | A | 1.24 | 2.3 | 3.34 | >3.34 | |
| | B | 0.44 | 0.64 | 0.72 | 1.00 | |
| | C | >3.15 | >3.15 | >3.15 | >3.15 | |
| | D | >3.34 | >3.34 | >3.34 | >3.34 | |
| | E | 3.34 | >3.34 | >3.34 | >3.34 | |
| | F | 2.93 | >3.23 | >3.23 | >3.23 | |
| | Biotrue | >3.34 | >3.34 | >3.34 | >3.34 | |
| *Serratia marescens* ATCC 13880 | A | >3.42 | >3.42 | >3.42 | >3.42 | |
| | B | 0.07 | 0.07 | 0.07 | 0.05 | |
| | C | 3.56 | >3.56 | >3.56 | >3.56 | |
| | D | 3.18 | >3.48 | >3.48 | >3.48 | |
| | E | 3.00 | >3.48 | >3.48 | >3.48 | |
| | F | 2.93 | >3.23 | >3.23 | >3.23 | |
| | Biotrue | >3.41 | >3.41 | >3.41 | >3.41 | >3.41 |
| *Candida albicans* ATCC 10231 | A | 0.19 | 0.27 | 0.27 | 0.42 | 1.42 |
| | B | 0.04 | 0.06 | 0.14 | 0.15 | 0.21 |
| | C | 2.76 | >3.72 | >3.72 | >3.72 | >3.72 |
| | D | 2.21 | 2.91 | >3.69 | >3.69 | >3.69 |
| | E | 2.46 | 3.08 | 3.69 | 3.69 | >3.69 |
| | F | 0.38 | 0.40 | 0.46 | 1.14 | 2.19 |
| | Biotrue | >3.57 | >3.57 | >3.57 | >3.57 | >3.57 |
| *Fusarium solani* ATCC 36031 | A | 0.54 | 0.9 | 0.94 | 1.37 | 2.24 |
| | B | −0.05 | −0.01 | −0.05 | −0.01 | −0.01 |
| | C | >2.20 | >2.20 | >2.20 | >2.20 | >2.20 |
| | D | 2.8 | 3.41 | >3.41 | >3.41 | >3.41 |
| | E | 1.7 | 2.93 | 3.11 | 3.11 | >3.41 |
| | F | 1.01 | 1.29 | 1.50 | 1.89 | >3.70 |
| | Biotrue | 2.54 | >2.54 | >2.54 | >2.54 | >2.54 |

The data in this Table represent averages from three independent experiments. Experiments were performed in the same laboratory and conducted by the same examiner.

Neither formulation A nor formulation B met the primary criteria of the ISO testing procedure (3.0 log reduction for bacteria, 1.0 log reduction for yeast and molds within the recommended soaking time) (Table 4). Therefore, a combination of PHMB and PQ-1, even when used at higher concentrations than in the positive control formulation Biotrue, is incapable of providing adequate antimicrobial activity when HA concentration is significantly increased. Antifungal activity is particularly affected. Replacement of PQ-1 with a second biguanide compound resulted in an even lower antimicrobial activity. Both antibacterial and antifungal activities were low. In summary, the test results showed that the presence of only two disinfectants (of two different classes or the same class) is insufficient to provide adequate antimicrobial activity in an MDS having a significantly increased concentration of HA compared to marketed MPDS.

Applicant then experimented to find out whether addition of a third disinfectant could remedy the deficiencies of formulations A and B. Excellent results were obtained with MAPD/Aldox as the third disinfectant (see Table 3 for a description of formulation C and Table 4 for data). The effect of MAPD was sufficiently strong to permit a reduction of the level of PQ-1 to that present in the positive control formulation, the marketed MPDS Biotrue (see Table 3 for a description of formulation D and Table 4 for data)). Assuming that comfort increases with concentration, the concentration of HA was further increased in formulation E (see Table 2) to a level that is 7.5 times greater than that present in marketed MPDS (e.g., Biotrue). As the data in Table 4 reveal, the bactericidal and fungicidal activities of formulation E readily satisfied the primary criteria of the ISO testing procedure at 4 h and all later timepoints. Therefore, formulation E that comprises disinfectants from three classes, i.e., a biguanide compound, a quaternary ammonium compound and an amido-amine compound, appears to provide an optimal combination of patient comfort (due to the presence of a high level of HA) and antimicrobial activity. It is noted that the slightly lower antimicrobial activity of formulation E at 2 h compared to that of formulations comprising lower concentrations of HA (e.g., formulations C and D) is not of practical relevance as lens wearers typically incubate their contact lenses overnight in MPDS (6-8 h).

In addition, formulation F based on a phosphate buffer system was tested with the same regime according to ISO 14729. Primary criteria are as follows: >3.0 log reduction of three test organisms (bacteria) was to be reached after 4 h and >1.0 log reduction for the two fungi strains was to be reached after 6-8 h. These results indicate that the disclosed synergistic effects of the three classes of disinfectants are functional in various buffer systems.

Example 2: Long Term Efficacy of Antimicrobial Preservation According to ISO 14730

To evaluate the long-term efficacy of the MPDS presented in this disclosure, formulation E was inoculated with five standard test organisms and subsequently stored at 20-25° C. for up to 28 days. Aliquots from the test solutions were removed and assayed for surviving organisms immediately after addition of microbes (T 0 h) and after 7, 14, 21 and 28 days of storage in accordance with ISO 14730 testing procedures. Immediately following withdrawal of the 14-day aliquots, the test solutions were re-inoculated with $1 \times 10^4$ to $1 \times 10^5$ CFU/ml of the same microorganism. Log reductions in the levels of test organisms were calculated for each time point. Results are presented in Table 6:

TABLE 6

Long-term antimicrobial preservation by formulation E

| | Incubation time | | | | |
|---|---|---|---|---|---|
| Test organism | [T 0 h] Log reduction | [7 Day] Log reduction | [14 Day] Log reduction | [21 Day] Log reduction | [28 Days] Log reduction |
| Aspergillus brasiliensis | 0.02 | 1.92 | 2.35 | 2.35 | 2.13 |
| Candida albicans | 1.46 | >4.51 | >4.51 | >4.54 | >4.54 |
| Escherichia coli | 0.80 | >4.58 | >4.58 | >4.62 | >4.62 |
| Staphylococcus aureus | 0.90 | >4.56 | >4.56 | >4.61 | >4.61 |
| Pseudomonas aeruginosa | >4.03 | >4.03 | >4.03 | >4.14 | >4.15 |

| Inoculum control | Challenge titer at T 0 h [CFU/ml] | 14-day Challenge titer [CFU/ml] | Cumulative Challenge titer [CFU/ml] |
|---|---|---|---|
| A brasiliensis | $6.1 \times 10^5$ | $3.4 \times 10^4$ | $6.4 \times 10^5$ |
| C. albicans | $6.4 \times 10^5$ | $5.8 \times 10^4$ | $7.0 \times 10^5$ |
| E. coli | $7.6 \times 10^5$ | $7.7 \times 10^4$ | $8.4 \times 10^5$ |
| S. aureus | $7.2 \times 10^5$ | $8.7 \times 10^4$ | $8.1 \times 10^5$ |
| P. aeruginosa | $2.1 \times 10^5$ | $6.0 \times 10^4$ | $2.7 \times 10^5$ |

TABLE 6-continued

Long-term antimicrobial preservation by formulation E

| Suitability Data | Control | Test Formulation E | Percent of Control [%] |
|---|---|---|---|
| A brasiliensis | 40 | 43 | 108 |
| C. albicans | 63 | 74 | 117 |
| E. coli | 58 | 64 | 110 |
| S. aureus | 52 | 57 | 110 |
| P. aeruginosa | 25 | 27 | 104 |

The "greater than" symbol (>) is used where no colonies were observed on plates, taking into account the sensitivity of the assay (for details see Example 1).

Test Method Acceptance Criteria:

Positive controls are positive for growth of the indicator organism. Negative controls are negative for the growth of indicator organism. The suitability control must demonstrate ≥50% organism recovery at the reported test formulation solution.

Test criteria in accordance with United States Pharmacopeia (USP) for a category 1 product (injections, other parenterals including emulsions, otic products, sterile nasal products and ophthalmic products made with aqueous bases or vehicles):

Bacteria: Not less than 1.0 log reduction from initial calculated count at 7 days, not less than 3.0 log reduction from initial count at 14 days, and no increase from 14 days count at 28 days.

Yeast & Molds: No increase form initial calculated count at 7, 14, 28 days

Formulation E met all test criteria. Especially in regard to the difficult-to-treat fungus *Aspergillus brasiliensis*, the performance of formulation E was excellent with a log reduction of 2.35 at day 14, and of >2 at days 21 and 28, i.e., after re-inoculation with the fungus at 14 days. This indicates that the synergistic effect of the three classes of disinfectants used in this MPDS was potent and long-lasting even though it contains a 7.5 times higher concentration of HA than marketed products.

Example 3: Biocompatibility of MPDS Formulation E According to ISO 10993-5

The biocompatibility of formulation E having a high content of hyaluronic acid (0.075% w/v) was evaluated for potential cytotoxic effects using an in vitro mammalian cell culture model. Biotrue MPDS served as a comparative product. This study was conducted in accordance with the guidelines of ISO 10993-5, Biological evaluation of medical devices—Part 5: Tests for in vitro cytotoxicity.

Briefly, sample solutions of formula E or Biotrue were mixed with double-strength Minimum Essential Medium (2×MEM) to a 50% concentration for testing (test solutions). The controls (negative control, reagent control and positive control) were extracted in single strength Minimum Essential Medium (1×MEM) at 37° C. for 24 hours. Triplicate monolayers of L929 mouse fibroblast cells were overlayed with test solutions or control extracts and incubated for 48 h at 37° C. in the presence of 5% $CO_2$. Following incubation, the monolayers were examined microscopically for abnormal cell morphology and cellular degeneration using the scoring system of Table 5. No pH shifts (color change in the medium) were observed.

Negative control: High density polyethylene (HDPE), Extraction ratio 3 $cm^2$: 1 mL; total extraction area 31.5 $cm^2$; extraction with 10 mL extraction vehicle at 37° C. for 24 hours.

Reagent Control: Single strength Minimum Essential Medium (92% Gibco MEM with Earle's salts) supplemented with 5% fetal bovine serum, 2% antibiotics (100 units/mL penicillin, 100 µg/mL streptomycin and 2.5 µg/mL amphotericin B) and 1% (2 mM) L-glutamine.

Positive Control: Powder-Free Latex Gloves (Composition: natural rubber latex, zinc carbamate accelerators, zinc oxide, and titanium dioxide), Extraction ratio 6 cm$^2$: 1 mL; total extraction area 60 cm$^2$; Extraction with 10 mL extraction vehicle at 37° C. for 24 h.

Diluent Vehicle: Double strength Minimum Essential Medium supplemented with 10% fetal bovine serum, 4% antibiotics (200 units/mL penicillin, 200 µg/mL streptomycin and 5.0 µg/mL amphotericin B) and 2% (4 mM) L-glutamine (2×MEM).

Control Extraction Vehicle: 1×MEM (Minimal essential medium).

Results of the experiment are shown in Table 8. Both formulation E and Biotrue showed a slight cytotoxicity (grade 1) and met the acceptance criteria of ISO 10993-5 for medical devices since the grade was lower or equal to grade 2 (mild cytotoxicity). Reagent, negative and positive controls performed as anticipated. Formulation E showed better biocompatibility than Biotrue: cell lysis was 10% for formulation E and 20% for Biotrue. This result indicates that formulation E which contains a 7.5 times higher concentration of HA than Biotrue has a significantly reduced (50%) cytotoxic potential compared to Biotrue.

TABLE 7

Scoring system

| Grade | Reactivity | Conditions of all cultures |
|---|---|---|
| 0 | None | Discrete intracytoplasmic granules. No lysis, no reduction of growth |
| 1 | Slight | Not more than 20% of cells are round, loosely attached and without intracytoplasmic granules, or show changes in morphology; occasional lysed cells are present; only slight growth inhibition observable. |
| 2 | Mild | Not more than 50% of cells layers contain rounded cells or cells devoid of intracytoplasmic granules; no extensive cell lysis; no more than 50% growth inhibition observable. |
| 3 | Moderate | Not more than 70% of cells layers contain rounded cells or lysed cells; cell layer not completely destroyed, but more than 50% growth inhibition observed. |
| 4 | Severe | Nearly complete destruction of the cell layer. |

TABLE 8

Results of the biocompatibility assay

| Well | Rounded Cells [%] | Cells without intracytoplasmic granules [%] | Cell Lysis [%] | Resulting Grade | Resulting Reactivity |
|---|---|---|---|---|---|
| Formulation E (1) | 10 | 10 | 10 | 1 | Slight |
| Formulation E (2) | 10 | 10 | 10 | 1 | Slight |
| Formulation E (3) | 10 | 10 | 10 | 1 | Slight |
| Biotrue MPDS (1) | 20 | 20 | 20 | 1 | Slight |
| Biotrue MPDS (2) | 20 | 20 | 20 | 1 | Slight |
| Biotrue MPDS (3) | 20 | 20 | 20 | 1 | None |
| Negative Control (1) | 0 | 0 | 0 | 0 | None |
| Negative Control (2) | 0 | 0 | 0 | 0 | None |
| Negative Control (3) | 0 | 0 | 0 | 0 | None |
| Reagent Control (1) | 0 | 0 | 0 | 0 | None |
| Reagent Control (2) | 0 | 0 | 0 | 0 | None |
| Reagent Control (3) | 0 | 0 | 0 | 0 | None |
| Positive Control (1) | Not Applicable | Not Applicable | 100 | 4 | Severe |
| Positive Control (2) | Not Applicable | Not Applicable | 100 | 4 | Severe |
| Positive Control (3) | Not Applicable | Not Applicable | 100 | 4 | Severe |

A larger scale batch (100 Liter) of Formulation E was further evaluated in more detail with an XTT test according to ISO 10993, published by the International Organization for Standardization: "Biological Evaluation of Medical Devices", Part 1: "Evaluation and testing within a risk management process", 2018, Part 5: "Tests for in vitro cytotoxicity", 2009 using a valuated method from the ICCR-Roßdorf GmbH (Germany) and a Xenometrix test kit. With the XTT assay, cell proliferation and viability as well as the mitochondrial metabolic competence of the cells after treatment with a test item is determined calorimetrically. The XTT test is based on the cleavage of the yellow tetrazolium salt XTT [_(sodium 3'-(1-phenylaminocarbonyl)-(3,4-tetrazolium)-bis-(4-methoxy-6-nitro)-benzenesulfonic acid hydrate)] to form an orange water soluble formazan dye by dehydrogenase activity in active mitochondria. This method was first described 1988 by SCUDIERO et al.

In brief, the potential cytotoxic effect was evaluated with a dilution series of formulation E in complete medium [RPMI 1640 medium (including glutamax), supplemented with 10% FCS, 1 mM sodium pyruvate, and 100 units/mL penicillin, and 100 µg/mL streptomycin] resulting in the following end concentrations 39.1 µg/mL, 78.1 µg/mL, 156 µg/mL, 313 µg/mL, 625 µg/mL, 1250 µg/mL; 2500 µg/mL, 5000 µg/mL. Subsequently the effect of the solution was examined after 24±1 h treatment time on prior prepared mouse L929 cell line (supplied by DSMZ, 38124 Braunschweig, Germany). In parallel several controls were tested as well:

Medium Control=Complete medium; Solvent control=Complete medium, Positive control=Sodium dodecyl sulfate (SDS; purity: ≥99%); Solvent=deionized water, diluted with complete medium to a ratio of 1:10 (v/v). The positive control was tested in 8 concentrations in a range from 3.1-250 µg/mL. Solvent control for the positive control=Complete medium and 10% (v/v) deionized water.

At the end of the incubation period, 50 µL of the XTT labelling mixture (Xenometrix, Allschwil, Switzerland) were added to each well. The cells were incubated and subsequently transferred to a microplate reader and the absorbance values were determined (Versamax® Molecular Devices, software SoftMax Pro Enterprise (version 4.7.1)) at 450 nm (reference wavelength 690 nm). A decrease in number of living cells results in a decrease in the overall activity of mitochondrial dehydrogenases in the sample. This decrease directly correlates to the amount of orange formazan formed, as monitored by the absorbance. The relative absorbance (=viability) as compared to the solvent control is calculated using this formula:

Relative absorbance =

$$100 \times \frac{(\text{mean absorbance}_{test\ item/positive\ control} - \text{absorbance}_{chemical\ blank})}{(\text{mean absorbance}_{solvent\ control} - \text{absorbance}_{chemical\ blank})}.$$

To calculate the concentration of toxicant required to reduce the relative absorbance to 50% of the solvent control (XTT50) the following formula is used:

$$XTT_{50} = Conc. > 50 - \frac{(Conc._{>50} - Conc._{<50}) \times (\%_{>50} - 50)}{(\%_{>50} - \%_{<50})}$$

a) Conc.>50=max. measured concentration with the % of solvent control >50% b) Conc.<50=min. measured concentration with the % of solvent control <50% c) %>50=relative absorbance at a) in % d) %<50=relative absorbance at b) in %

The lower the XTT50 value, the higher is the cytotoxic potential of the test item. A test item is considered to have a cytotoxic effect if the cell viability of at least one concentration is <70% in comparison to the solvent control.

TABLE 9

Results of XTT cytotoxicity assay (formulation E)

| Test Group | Conc. [µg/mL] | Mean Absorbance* | SD | Chem. Blank | Mean Absorbance minus Chem. Blank | Viability [%]** |
|---|---|---|---|---|---|---|
| Solvent Control (Test Item) | — | 0.884 | 0.022 | 0.104 | 0.781 | 100.00 |
| Test Item = Formulation E | 39.1 | 0.969 | 0.025 | 0.110 | 0.859 | 110.05 |
| | 78.1 | 0.965 | 0.008 | 0.109 | 0.856 | 109.70 |
| | 156 | 0.978 | 0.009 | 0.110 | 0.869 | 111.27 |
| | 313 | 0.948 | 0.011 | 0.109 | 0.839 | 107.43 |
| | 625 | 0.976 | 0.013 | 0.113 | 0.863 | 110.55 |
| | 1250 | 0.956 | 0.015 | 0.113 | 0.843 | 107.92 |
| | 2500 | 0.955 | 0.014 | 0.113 | 0.842 | 107.85 |
| | 5000 | 0.900 | 0.029 | 0.112 | 0.787 | 100.85 |
| Medium Control | — | 0.943 | 0.019 | 0.108 | 0.835 | 110.58 |
| Solvent Control (Positive C.) | — | 0.855 | 0.021 | 0.100 | 0.755 | 100.00 |
| SDS | 3.1 | 0.833 | 0.012 | 0.101 | 0.732 | 96.94 |
| | 6.3 | 0.835 | 0.017 | 0.101 | 0.734 | 97.25 |
| | 12.5 | 0.863 | 0.019 | 0.109 | 0.754 | 99.88 |
| | 25.0 | 0.794 | 0.032 | 0.101 | 0.693 | 91.73 |
| | 50.0 | 0.744 | 0.021 | 0.102 | 0.642 | 84.99 |
| | 100 | 0.143 | 0.004 | 0.100 | 0.044 | 5.80 |

TABLE 9-continued

Results of XTT cytotoxicity assay (formulation E)

| Test Group | Conc. [µg/mL] | Mean Absorbance* | SD | Chem. Blank | Mean Absorbance minus Chem. Blank | Viability [%]** |
|---|---|---|---|---|---|---|
| | 125 | 0.116 | 0.002 | 0.104 | 0.012 | 1.63 |
| | 250 | 0.087 | 0.005 | 0.086 | 0.001 | 0.16 |

++ The test groups using SDS and at concentrations 100, 125, and 250 indicated cytotoxic effects in the photometric evaluation.
*mean absorbance (absolute) of 7 wells
**relative absorbance [rounded values]

$XTT_{50}$-value of formulation E could not be determined as viability was not reduced below 50%;

$XTT_{50}$-value of the positive control: 72.09 µg/mL

Ratio solvent control (positive control)/medium control: 90.44%.

In this XTT assay formulation E showed no negative effect on the cell growth of mouse L929 fibroblast cells. Results are in-line with above morphological assessment and verifying high biocompatibility of the solution.

Example 4: Long-Term Elution of HA from Silicone Hydrogel Contact Lenses

It is known from the literature that silicone hydrogel contact lenses can absorb HA from lens care solutions during incubation whereby a kind of HA depot is formed in the contact lenses. From this depot, HA is slowly released during lens wear, improving surface wettability and comfort (Scheuer et al. Clin. Ophthalmol., 2016, pp. 1945-1952). Since the ophthalmic formulations of this disclosure contain 1.5 to 7.5 times higher concentrations of HA than marketed formulations such as Biotrue, a better depot effect in the silicone hydrogel lenses is expected for the formulations of the present disclosure. To verify this prediction, a side by side comparison of formulation E and Biotrue was carried out.

In the experiment, release of HA was evaluated using four marketed lens types, i.e., Comfilcon A (Biofinity), fanfilcon A (Avaira Vitality), lotrafilcon B (Air Optix Aqua) and senofilcon A (Acuvue Oasys). Multiple lenses per lens type were removed from their package and equilibrated for 7 h in phosphate-buffered saline (PBS) at ambient temperature and with agitation (in a 24-well plate; 2 lenses per well). Lenses were then soaked for 16 h under overnight storage conditions (ambient temperature, no agitation) in 3 mL of either formulation E or Biotrue. After lens care storage, lenses were gently blotted on laboratory tissue to remove carryover solution and transferred to 24-well plates containing 500 µL PBS/well. The plates were then incubated at ambient temperature for 24 h. Aliquots of 100 µL were removed from wells at 1, 3, 5, 7 and 24 h und stored at 40 C until analysis. Fresh PBS (100 µL) was added to the wells after each withdrawal. Aliquots were diluted 1:200, and HA was quantified by ELISA according to the manufacturer's instructions (ELISA Hyaluronan kit, R&D Systems, Minneapolis, MN).

Results are shown in Table 10. The data indicate that larger amounts of HA were released at each time point (except at the 1-h time point for Avaira Vitality lenses) from the lenses that had been soaked with formulation E than from the lenses that had been incubated with Biotrue.

TABLE 10

Release of HA from silicone hydrogel contact lenses (ng per lens)

| | Lenses | | | | | | | |
|---|---|---|---|---|---|---|---|---|
| | Acuvue Oasis | | Biofinity | | Air Optix Aqua | | Avaira Vitality | |
| | | | | MPDS | | | | |
| | Biotrue | Formulation E | Biotrue | Formulation E | Biotrue | Formulation E | Biotrue | Formulation E |
| 1 hour | 1784 (±128) | 2751 (±309) | 1344 (±198) | 1766 (±835) | 1569 (±71) | 1953 (±383) | 1634 (±68) | 1110 (±89) |
| 3 hours | 1554 (±214) | 2400 (±166) | 1525 (±156) | 1885 (±311) | 1208 (±187) | 1715 (±71) | 1425 (±72) | 2365 (±104) |
| 5 hours | 942 (±22) | 1674 (±57) | 1052 (±76) | 1203 (±269) | 721 (±22) | 1407 (±82) | 700 (±36) | 1774 (±5) |
| 7 hours | 455 (±31) | 860 (±163) | 652 (±17) | 946 (±90) | 454 (±49) | 989 (±111) | 443 (±8) | 861 (±23) |
| 24 hours | 148 (±8) | 523 (±72) | 673 (±226) | 1188 (±82) | 160 (±37) | 634 (±142) | 194 (±87) | 584 (±68) |

Standard deviations in parentheses

Example 5: Long-Term Elution of HA from Silicone Hydrogel Contact Lenses into Synthetic Tear Fluid A similar experiment to that discussed under Example 4 can be carried out to evaluate the release of HA from lenses incubated in different MPDS into tear fluid. Since human tears differ in composition between individuals, e.g. in pH, salt content and osmolarity, and results may be influenced by the behavior of study participants, a standardized in vitro test procedure is employed for such a comparison.

In the experiment, two types of marketed silicone hydrogels contact lenses (Biofinity, Comfilcon A Cooper Vision and Acuvue Oasys, Senofilcon A J&J) are placed in wells of a 24-well cell culture plate (plate without surface modification; Eppendorf AG, Hamburg, Germany). Aliquots of 1.8 ml of the MPDS formulations to be tested (formulation E; Biotrue from B&L; Hycare from Cooper Vision) are added to the wells, and the plate is incubated for 8 h at room temperature (4 contact lenses per MPDS formulation). The soaked contact lenses are subsequently lightly rinsed with a 0.9% NaCl solution to remove residual MPDS on the surface and carefully transferred to wells of a fresh 24-well plate containing 1.8 ml/well of a complex synthetic tear fluid (prepared according to Lorentz et. al. Mol. Vis. (2011) 17: 3392-3405). To assess release of HA from the contact lenses into the synthetic tear fluid, aliquots of 40 µl are withdrawn at 0 h, 0.5 h, 1 h, 2 h, 4 h, 8 h, 12 h and 24 h. (The removed volumes are replaced by fresh synthetic tear fluid to simulate turnover of tear fluid (approx. 1.2 µl/min according to Wilson, Cambridge University Press. 2004. ISBN: 9780521841580). Aliquots are stored at 4° C. until analysis of HA concentration by means of a Hyaluronan Enzyme-Linked Immunosorbent Assay (HA ELISA, Echelon Biosciences, USA).

It is expected that this experiment will reveal that larger amounts of HA are released into tear fluid at each time point from lenses incubated with formulation E compared with lenses incubated with the other formulations.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values and vice versa (e. g., all exact exemplary values provided with respect to a particular factor or measurement can be considered to also provide a corresponding approximate measurement, modified by "about," where appropriate, and vice versa).

The terms "a", "an", "the" and similar terms are to be construed to cover both the singular and the plural unless otherwise indicated or clearly contradicted by the context.

The description herein of any aspect or embodiment of the invention using terms such as reference to an element or elements is intended to provide support for a similar aspect or embodiment of the invention that "consists of," "consists essentially of" or "substantially comprises" that particular element or elements, unless otherwise stated or clearly contradicted by context (e. g., a composition described herein as comprising a particular element should be understood as also describing a composition consisting of that element, unless otherwise stated or clearly contradicted by context).

Preferably as understood herein, the ratio term weight to volume, referred to herein as w/v, or (w/v), which may also be expressed in the percentage (%) value, refers to the ratio of the weight of dissolved substance as expressed in grams (g), to the volume of the solution as expressed in milliliters (mL).

This invention includes all modifications and equivalents of the subject matter recited in the aspects or claims presented herein to the maximum extent permitted by applicable law.

All references cited in this application, including publications, patents and patent applications, shall be considered as having been incorporated in their entirety.

Further embodiments of the invention are disclosed in the following numbered items:

1. A multipurpose disinfection solution for ophthalmic applications comprising a multimeric biguanide compound in an amount ranging from about 0.00005 to about 0.0005% w/v, a quaternary ammonium compound in an amount ranging from about 0.00005 to about 0.0025% w/v, an antifungal/anti-acanthamoeba agent in an amount ranging from about 0.00005 to about 0.0025% w/v and hyaluronic acid or a salt thereof in an amount ranging from about 0.015 to about 0.1% w/v.

2. The multipurpose disinfection solution of item 1, wherein the antifungal/anti-acanthamoeba agent is an amido-amine compound.

3. The multipurpose disinfection solution of item 2, wherein the multimeric biguanide compound is present in an amount ranging from about 0.0001 to about 0.0002% w/v, the quaternary ammonium compound is present in an amount ranging from about 0.000075 to about 0.001% w/v and the amido-amine compound is present in an amount ranging from about 0.0001 to about 0.0018% w/v.

4. The multipurpose disinfection solution of item 2, wherein the multimeric biguanide compound is present in an amount ranging from about 0.00012 to about 0.00016% w/v, the quaternary ammonium compound is present in an amount ranging from about 0.000085 to about 0.00012% w/v and the amido-amine compound is present in an amount ranging from about 0.0006 to about 0.0014% w/v.

5. The multipurpose disinfection solution of any of items 1-4, wherein the hyaluronic acid or a salt thereof is present in an amount ranging from about 0.025% w/v to about 0.085% w/v.

6. The multipurpose disinfection solution of any of items 1-4, wherein the hyaluronic acid or a salt thereof is present in an amount ranging from about 0.04% w/v to about 0.08% w/v.

7. The multipurpose disinfection solution of any of items 1-6, wherein the multimeric biguanide compound is selected from the group consisting of polyhexamethylene biguanide, polyaminopropyl biguanide and 1,1'-hexamethylene-bis(5-[2-ethylhexyl]biguanide), the quaternary ammonium compound is selected from the group consisting of Polyquaternium-1, Polyquaternium-10, Polyquaternium-42, N-dodecyl{4,4'-(2,4,8,10-tetraoxaspiro [5.5]undecan-3,9-diyl)}dipyridinium dibromide, 3,3'-[1,4-phenylenebis(oxy)]bis(1-dodecyl pyridinium)dibromide; 3-(3-hydroxy-2-(hydroxymethyl)-2-{[(1-dodecylpyridinium-3-yl)oxy]methyl}propoxy)-1-dodecylpyridinium dibromide, 5,50-[2,20-(tetramethylenedicarbonyldioxy) diethyl]bis(3-alkyl-4-methylthiazolium iodide) and [4,40-(1,6-hexamethylenedithio)bis(1-octylpyridiniumiodide)], and the amido-amine compound is myristamidopropyl dimethylamine.

8. The multipurpose disinfection solution of item 7, wherein the multimeric biguanide compound is polyhexamethylene biguanide and the quaternary ammonium compound is Polyquaternium-1.

9. The multipurpose disinfection solution of any of items 1-8 further comprising one or more of a chelating agent in an amount ranging from about 0.01% w/v to about 0.06% w/v, a buffer in an amount ranging from about 0.01% w/v to about 1% w/v, a viscosity-modifying agent in an amount ranging from about 0.01% w/v to about 0.25% w/v, a surface-active compound in an amount ranging from about 0.01% w/v to about 1% w/v, a tonicity agent in an amount ranging from about 0.001% w/v to about 1% w/v, a calcium salt in an amount ranging from about 0.001% w/v to about 0.015% w/v and a magnesium salt in an amount ranging from about 0.001% w/v to about 0.015% w/v.

10. The multipurpose disinfection solution of item 9, wherein the chelating agent is ethylenediaminetetraacetic.

11. The multipurpose disinfection solution of item 9, wherein the buffer is a borate buffer.

12. The multipurpose disinfection solution of item 9, wherein the viscosity-modifying agent is selected from the group consisting of hydroxypropylmethyl cellulose, carboxymethyl cellulose and hydroxyethyl cellulose.

13. The multipurpose disinfection solution of item 12, wherein the viscosity-modifying agent is hydroxypropylmethyl cellulose.

14. The multipurpose disinfection solution of item 9, wherein the surface-active compound is a poloxamine.

15. The multipurpose disinfection solution of item 9, wherein the tonicity agent is sodium chloride or a combination of sodium chloride and potassium chloride.

The invention claimed is:

1. A solution comprising a multimeric biguanide compound in an amount ranging from about 0.00005 to about 0.0005% w/v, a quaternary ammonium compound in an amount ranging from about 0.00005 to about 0.0025% w/v, an antifungal/anti-acanthamoeba agent in an amount ranging from about 0.00005 to about 0.0025% w/v, wherein the antifungal/anti-acanthamoeba agent is an amido-amine compound, and hyaluronic acid or a salt thereof in an amount ranging from about 0.015 to about 0.1% w/v.

2. The solution of claim 1, wherein the multimeric biguanide compound is present in an amount ranging from about 0.0001 to about 0.0002% w/v, the quaternary ammonium compound is present in an amount ranging from about 0.000075 to about 0.001% w/v and the amido-amine compound is present in an amount ranging from about 0.0001 to about 0.0018% w/v.

3. The solution of claim 1, wherein the multimeric biguanide compound is present in an amount ranging from about 0.00012 to about 0.00016% w/v, the quaternary ammonium compound is present in an amount ranging from about 0.000085 to about 0.00012% w/v and the amido-amine compound is present in an amount ranging from about 0.0006 to about 0.0014% w/v.

4. The solution of claim 1, wherein the hyaluronic acid or a salt thereof is present in an amount ranging from about 0.025% w/v to about 0.085% w/v.

5. The solution of claim 1, wherein the hyaluronic acid or a salt thereof is present in an amount ranging from about 0.04% w/v to about 0.08% w/v.

6. The solution of claim 1, wherein the multimeric biguanide compound is selected from the group consisting of polyhexamethylene biguanide, polyaminopropyl biguanide and 1,1'-hexamethylene-bis(5-[2-ethylhexyl]biguanide);

the quaternary ammonium compound is selected from the group consisting of Polyquaternium-1, Polyquaternium-10, Polyquaternium-42, N-dodecyl{4,4'-(2,4,8,10-tetraoxaspiro [5.5]undecan-3,9-diyl)}dipyridinium dibromide, 3,3'-[1,4-phenylenebis(oxy)]bis(1-dodecyl pyridinium)dibromide, 3-(3-hydroxy-2-(hydroxymethyl)-2-{[(1-dodecylpyridinium-3-yl)oxy]methyl}propoxy)-1-dodecylpyridinium dibromide, 5,50-[2,20-(tetramethylenedicarbonyldioxy) diethyl]bis(3-alkyl-4-methylthiazolium iodide) and [4,40-(1,6-hexamethylenedithio bis(1-octylpyridiniumiodide)]; and the amido-amine compound is myristamidopropyl dimethylamine.

7. The solution of claim 6, wherein the quaternary ammonium compound is 3,3'-[1,4-phenylenebis(oxy)]bis(1-dodecyl pyridinium)dibromide.

8. The solution of claim 1, wherein the quaternary ammonium compound is N-dodecyl{4,4'-(2,4,8,10-tetraoxaspiro [5.5]undecan-3,9-diyl)}dipyridinium dibromide.

9. The solution of claim 6, wherein the multimeric biguanide compound is poly(hexamethylene biguanide) and the quaternary ammonium compound is Polyquaternium-1.

10. The solution of claim 1, further comprising one or more of a chelating agent in an amount ranging from about 0.01% w/v to about 0.06% w/v, and/or a buffer in an amount ranging from about 0.01% w/v to about 1% w/v, and/or a viscosity-modifying agent in an amount ranging from about 0.01% w/v to about 0.25% w/v, and/or a surface-active compound in an amount ranging from about 0.01% w/v to about 1% w/v, and/or a tonicity agent in an amount ranging from about 0.001% w/v to about 1% w/v.

11. The solution of claim 10, wherein the chelating agent is ethylenediaminetetraacetic acid or tetrasodium N,N-bis(carboxymethyl)-L-glutamate.

12. The solution of claim 10, wherein the buffer is a borate buffer or a phosphate buffer.

13. The solution of claim 10, wherein the viscosity-modifying agent is selected from the group consisting of hydroxypropylmethyl cellulose, carboxymethyl cellulose and hydroxyethyl cellulose.

14. The solution of claim 13, wherein the viscosity-modifying agent is hydroxypropylmethyl cellulose.

15. The solution of claim 10, wherein the viscosity-modifying agent is poly(acryloyl-lysine) or copolymers containing side chain-acrylated amino acids.

16. The solution of claim 10, wherein the surface-active compound is a poloxamine.

17. The solution of claim 10, wherein the tonicity agent is sodium chloride or a combination of sodium chloride and potassium chloride, and wherein the composition optionally comprises mannitol.

18. The solution of claim 10, further comprising a calcium salt in an amount ranging from about 0.001% w/v to about 0.015% w/v and/or a magnesium salt in an amount ranging from about 0.001% w/v to about 0.015% w/v.

19. The solution of claim 1, wherein the solution is a multipurpose disinfection solution.

20. The solution of claim 1, wherein the solution is an ophthalmic formulation.

21. A method of disinfecting a contact lens, which comprises contacting a contact lens with the solution of claim 1.

22. The method of claim 21, wherein said contact lens is soaked in said solution.

* * * * *